United States Patent [19]

Nixon

[11] Patent Number: 5,009,912

[45] Date of Patent: Apr. 23, 1991

[54] METHOD OF MAKING A MILK FORMULATION

[76] Inventor: Floyd K. Nixon, 516 Ellis Dr., Paris, Tenn. 38242

[21] Appl. No.: 525,695

[22] Filed: May 21, 1990

Related U.S. Application Data

[63] Continuation-in-part of Ser. No. 369,628, Jun. 20, 1989, abandoned.

[51] Int. Cl.⁵ ............................................. A23C 9/137
[52] U.S. Cl. .................................... 426/580; 426/573; 426/588
[58] Field of Search ............... 426/580, 583, 572, 573, 426/588

[56] References Cited

U.S. PATENT DOCUMENTS

| | | | |
|---|---|---|---|
| 3,539,363 | 11/1970 | Morgan et al. | 426/522 |
| 3,573,058 | 3/1971 | Tiemstra | 426/573 |
| 3,978,243 | 8/1976 | Pederson | 426/573 |
| 4,264,637 | 4/1981 | Braverman | 426/573 |

*Primary Examiner*—Marianne Cintins
*Assistant Examiner*—Helen Pratt
*Attorney, Agent, or Firm*—Fred Philpitt

[57] ABSTRACT

A mixture of skim milk or low fat milk and
(A) 0.18–0.80% by weight based on the weight of the milk of a mixture of
  (a) 88–89% by weight of microcrystalline cellulose and
  (b) 11–12% by weight of carboxy-methyl cellulose and
(B) 0.1–1.0% by weight based on the weight of the milk of gum arabic.

2 Claims, No Drawings

METHOD OF MAKING A MILK FORMULATION

This application is a continuation-in-part application of my prior application Ser. No. 369,628 filed 6-20-89, abandoned 11-19-90 and I claim the benefit of 35 USC 120 relative to it.

In recent years many doctors and medical authorities have emphasized the importance of low-fat diets, and as a consequence are recommending the use of skim milk or low-fat milk in place of whole milk. However, skim milk does not have the same pleasing taste, mouth-feel and appearance as whole milk, and as a consequence the use of skim milk and low-fat milk has not been as great as it could be.

My invention pertains to modifying skim milk or low-fat milk so that it will have a taste, mouth-feel and appearance that is very similar to whole milk and which thus increases the acceptability of skim milk and low-fat milk as a substitute for whole milk.

More particularly, my invention causes skim milk (milk with less than 1 gram of milk-fat per 8 oz. serving) to have the taste, mouth-feel and appearance of whole milk (3¼% milk-fat) and subjectively in many cases of taste-testing exceeding the taste, mouth-feel and sometimes even the appearance of whole milk. My invention enhances low-fat milk so that it either approaches or even betters the taste of whole milk. Some lowering of the digestibility of the milk-fat content of skim, and low-fat milk also occurs by surrounding fat molecules and globules and rendering these indigestible and calorieless.

My invention makes a colloidal three-dimensional network of cellulite particles which impedes the flow of fluid milk and simulates an increase of viscosity. This gives a taste of higher fat content with a clean mouth-feel with total taste and appearance improvement, that is unobtainable by simply increasing viscosity mouth-feel.

In accordance with a preferred embodiment of my invention I have produced an improved liquid milk product comprising skim milk or low-fat milk and
(A) 0.18–0.80% by weight (based on the weight of the milk) of a colloidal grade of microcrystalline cellulose (or "peptized" microcrystalline cellulose) consisting of a mixture of
  (a) 88–89% by weight of microcrystalline cellulose (MCC) and
  (b) 11–12% by weight of carboxy-methyl cellulose (CMC) and
(B) 0.1–1.0% by weight (based on the weight of the milk) of gum arabic.

Microcrystalline cellulose is a naturally occurring cellulose that has been purified. Its native cellulose form is the same as that contained in the fruit and vegetables found in grocery stores. MCC is usually isolated from wood pulp and the specific starting material for microcrystalline cellulose is usually alpha cellulose.

Cellulose fiber is composed of millions of microfibrils and each microfibril is composed of two distinctly different regions:
  (a) the paracrystalline region which is an amorphous and flexible mass of cellulose chains, and
  (b) the crystalline region which is composed of tight bundles of cellulose chains in a rigid, linear arrangement.

The total cellulose fiber is hydrolyzed to totally remove the paracrystalline amorphous, flexible mass and the rigid crystalline bundles are left. The crystalline bundles are then put through an attrition process to break up the aggregate bundles and release the microcrystals. In order to keep the microcrystals from reaggregating during a drying process, they are co-processed with a hydrophilic dispersant, sodium carboxymethylcellulose (CMC). This produces a colloidal grade of microcrystalline cellulose or "colloidal MCC". There are two processes of drying this colloidal MCC. One drying process is bulk drying the other is spray-drying.

The Food Machinery Corporation produces a spray-dried colloidal microcrystalline cellulose that contains 88–89% MCC and 11–12% CMC and is suitable for use with my invention under the trademark AVICEL RC 591.

My liquid milk product can be produced by either
(1) adding said colloidal microcrystalline cellulose to fluid milk and heavily beating with sheared agitation for 5 minutes to 25 minutes (depending on the volume and temperature of the milk) or
(2) adding spray-dried or bulk-dried colloidal microcrystalline cellulose to fluid milk and then homogenizing.

My invention can be illustrated by the following example:

150.48 grams of a "dry blend" was produced by mixing together (a) 119.12 grams of Avicel 591 which was a peptized MCC containing about 88–89% MCC and 11–12% CMC, and (b) 31.36 grams of spray dried gum arabic.

8 gallons of skim milk were placed in a 10 gallon container that included an agitator with good shear. The agitator was turned on to high speed and 150.48 grams of the above "dry blend" were added slowly and uniformly to the vortex to thereby thoroughly distribute the "dry blend" in the skim milk. The resulting mixture was pasteurized by rapidly raising the temperature of the mixture to 140° F. under agitation and held under agitation for 60 seconds. The 8 gallon mixture was then homogenized by raising the pressure to a minimum of 1700 p.s.i. The resulting modified skin milk had a taste, mouth-feel and appearance approaching that of whole milk.

When these colloidal grades of MCC are shear beaten properly, or homogenized with skim milk the cellulose crystallites set up a three dimensional network with particles less than 0.2 microns. It is the formation of this insoluble cellulose crystalline three dimensional network that controls the movement of fluid milk which gives it the properties that simulate an increase of viscosity with a clean mouth-feel. This measurable increase in apparent viscosity is not a true, permanent increase in viscosity. This network does break down upon stirring, pouring, etc., but immediately regroups. The network breakdown is completely unnoticeable. Apparent viscosity increase is measurable, after homogenization and cooling, then held 24 hours for complete bonding.

The spray-dried co-processed MCC and CMC gives best results when homogenized with milk, but can be shear whipped and gain suspension of microcrystals. Bulk dried colloidal MCC gives adequate results if homogenized with milk but will not suspend permanently the microcrystals when shear whipped.

Homogenization is preferably carried out in two stages, at a pressure of about 2,000 p.s.i. in the first stage and at a pressure of about 2,500 p.s.i. in a second stage.

My improved skim milk or low-fat milk may also contain a number of other additives (i.e. vitamins, etc.) so long as such additives do not interfere with the improvements in taste, mouth-feel and appearance of the milk that is achieved by adding 0.18-80% of colloidal MCC and 0.1-1.0% gum arabic.

What I claim is:

1. A method for improving skim milk and low-fat milk so that they approach the taste, mouth-feel and appearance of whole milk which consists essentially of mixing skim milk or low fat milk with
   (A) 0.18-0.80% by weight (based on the weight of the milk) of a colloidal grade of microcrystalline cellulose or peptized microcrystalline cellulose consisting of a mixture of
      (a) 88-89% by weight of microcrystalline cellulose (MCC) and
      (b) 11-12% by weight of carboxy-methyl cellulose (CMC) and
   (B) 0.1-1.0% by weight (based on the weight of the milk) of gum arabic.

2. A milk composition that approaches the taste, mouth-feel and appearance of whole milk which consists essentially of a mixture of skim milk or low fat milk and
   (A) 0.18-0.80% by weight base on the weight of the milk of a colloidal grade of microcrystalline cellulose or peptized microcrystalline cellulose which consists of a mixture of
      (a) 88-89% by weight of microcrystalline cellulose and
      (b) 11-12% by weight of carboxy-methyl cellulose and
   (B) 0.1-1.0% by weight based on the weight of the milk of gum arabic.

* * * * *